DATA STORAGE INTERROGATION ERROR PREVENTION SYSTEM

Filed Nov. 22, 1961

INVENTORS L. S. TUOMENOKSA
W. ULRICH

BY Lucian C. Canepa

ATTORNEY

United States Patent Office 3,231,858

Patented Jan. 25, 1966

3,231,858
DATA STORAGE INTERROGATION ERROR PREVENTION SYSTEM

Lee S. Tuomenoksa, Colts Neck, and Werner Ulrich, Madison, N.J., assignors to Bell Telephone Laboratories, Incorporated, New York, N.Y., a corporation of New York

Filed Nov. 22, 1961, Ser. No. 154,218
14 Claims. (Cl. 340—146.1)

Figure 1:
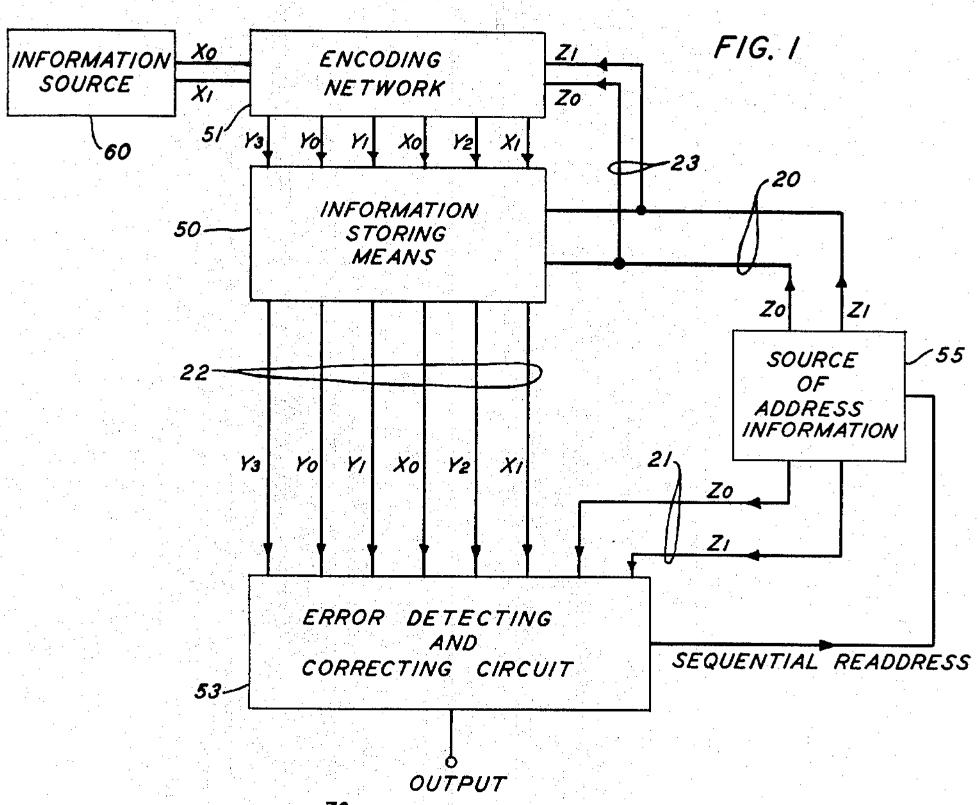

This invention relates to the transmission and processing of digital information, and more particularly to the detection and correction of errors encountered therein.

Methods for detecting and correcting errors present in the digits, or "bits," of a binary word are well known in the art. Typically, detection is performed by encoding the information bits of a binary word with the addition of extra, noninformation bearing digits, usually referred to as parity checking, or parity bits.

The number of parity bits necessary to detect an error in a given number of information bits is dependent upon the type, number and probability of the expected errors. Different coding methods and their proper applications and limitations comprise a great part of the subject matter in the field of information theory. For a rather extensive review of different coding methods, see, for example, the textbook "Error-Correcting Codes" by W. W. Peterson, published in 1961 by John Wiley & Sons.

One simple example of a detection method is the so-called even (or odd) parity check. This scheme is capable of detecting only a single error and requires just one additional parity checking bit for each information word. When generating the check, the number of 1 digits in the information word is counted. If the number is odd, a 1 (for even parity) is placed in the parity bit location, thereby creating an even number of 1's in the resulting word. Correspondingly, a 0 is placed in the parity location for a word containing an even number of 1's.

At the detection stage of such a parity system, the number of received 1's is counted, and if an even count results, the word is assumed correct. An odd count, on the other hand, denotes the presence of an error.

Thus, even (or odd) parity checking is capable of detecting single errors, but is incapable of correcting them. A great many prior art coding schemes, however, do have the capability of performing this correction function. One example, among many others, is the Hamming code which is described in detail in R. W. Hamming et al. Reissue Patent 23,601, issued December 23, 1952.

These aforementioned error prevention methods have applicability wherever digital information is transmitted, and have also been widely employed when obtaining data by interrogating an information storage device by either random or sequential access techniques. Typically, the the digital information stored at each address of such a device comprises both information bits and parity checking bits which are encoded to perform a check on the associated information bits stored therewith. Any output binary word resulting from an interrogation of the storage device may be checked for errors upon being received from the device and/or during transmission therefrom.

When performing in this manner, however, all prior art schemes inherently assume that the information derived from the storage device has been read out from the proper address. The difficulty involved in this assumption is that a correct word may be read out from an incorrect address, thereby not causing the parity to fail. Hence, such schemes are unable to detect and/or correct errors which stem from this particular type of faulty operation.

It is, therefore, an object of the present invention to improve the error detection and correction capabilities of digital information transmission and processing systems.

More specifically, an object of this invention is to provide unique identification for the binary words utilized in such systems, such that the processing of an erroneous word therein is prevented.

Another object of the present invention is to detect and correct errors generated when an information storage medium is incorrectly addressed.

It is another object of the present invention to detect and correct errors resulting from the transmission of tabularized digital data.

These and other objects of the present invention are realized in a specific illustrative embodiment thereof wherein an information store is interrogated by a source of addressing binary bits, and the digital read-out from the store is coupled to an error detection and correction circuit.

Contained at each word address in the information store are both information bits and parity checking bits. These parity checking bits do not simply perform an encoding on the information bits, but they encode both the information bits and the corresponding address bits, although the address information is not contained therewith in the store.

The above-described information bits and parity checking bits are supplied to their storage address locations by an encoding network. During the read-in process, the encoding network responds to both the information bits of a word and the bits of the corresponding storage address word by computing the parity checking bits, and subsequently transmits the information bits and parity checking bits to the information store.

When a read-out of a stored word is desired, the corresponding address bits are transmitted independently to both the information store and the error detecting and correcting circuit. Upon reception of the address bits, the store reads out and transmits the corresponding information stored therein to the detecting and correcting circuit to which, as noted, the address information is also applied.

The detection and correction circuit rechecks parity by performing the inverse of the coding operation. If the information came from the proper location in the store and was transmitted to the detection and correction circuit without incurring any errors, the parity check will reveal no irregularities, and an output results. If a single one of the information or parity bits is in error, this is detected and corrected and again an output results. On the other hand, any errors in addressing the store or any double errors cause a sequential readdressing of the information store.

Thus, the illustrative system insures that the information has come from the proper storage address in the store and also that the information has incurred no errors in transmission.

It is thus one feature of the present invention that an encoding network respond to both information bits and address bits which define a particular address location in an information store by computing parity checking bits and by transmitting the information bits and parity checking bits to the particular address in the information store.

It is another feature of the present invention that an information store include therein a plurality of digital words, each comprising information bits and parity checking bits, which are uniquely identifiable as to their storage address.

It is another feature of the present invention that an information store contain at each address information bits and parity checking bits, wherein the parity checking bits are encoded to provide a check on both the stored and address information.

Still another feature of the present invention is that a randomly or sequentially accessed store system include a source of address information, an information store, and an error detecting and correcting circuit, wherein an address is transmitted independently to both the error detecting and correcting circuit and the information store, and wherein the stored information is also transmitted to the error detecting and correcting circuit upon interrogation of the information store, whereby any single error in the stored word is corrected and any double error therein is detected to cause a sequential readdressing of the store.

Figure 2:
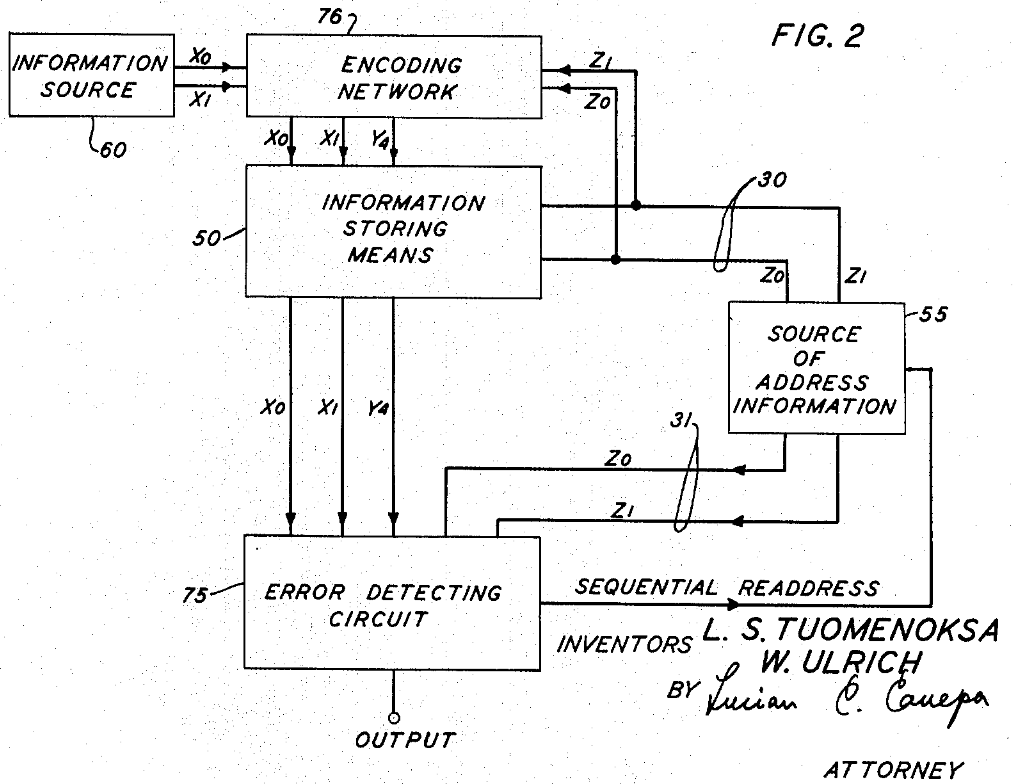

A complete understanding of the present invention and of the above and other features and advantages thereof may be gained from a consideration of the following detailed description of two illustrative embodiments thereof presented hereinbelow in conjunction with the accompanying drawing, in which:

FIG. 1 depicts an error detection and correction system which illustratively embodies the principles of the present invention; and FIG. 2 depicts an error detection system which illustratively embodies aspects of the present invention.

Referring now to FIG. 1, there is depicted an information store 50 which contains a plurality of binary words each of which comprises a plurality of elements, the composition of which will be described hereinafter. This information store 50 may comprise, for example, magnetic core, cryogenic, thin film, or relay memories, all well known in the art.

Each of these binary words is stored at a definite location or address which is also representable in binary form. A source 55 of address information is shown as directing address bits independently to the information store 50 and also to an error detecting and correcting circuit 53 and an encoding network 51, which are more particularly considered hereinafter, along leads 20, 21 and 23, respectively.

Upon each occurrence of an address from the source 55, the information store 50 transmits the binary word stored at the corresponding address location to the detecting and correcting circuit 53 along a plurality of leads 22. The transmitted binary word comprises both information bits and parity bits which perform an encoding over both the information and address bits, although the address bits are not actually contained in the stored words. Although the encoding may be any one of the many detecting and correcting codes well known in the art, the so-called Hamming code, which is described in detail in the aforecited reissue patent, will be used throughout in the interest of being specific and definite.

When the stored information read-out from the store 50 and the address information from the source 55 are concurrently contained in the detection and correction circuit 53, the parity of the word received from the store 50 is rechecked. Any single error present in either the information or parity checking bits thereof is corrected and an output results. On the other hand, a double error or an error in address causes a sequential readdressing of the store.

The information bits and parity checking bits stored at each address of the store 50 are supplied thereto by an encoding network 51 during the read-in process. When a particular information word supplied by an information source 60 is applied to the encoding network 51, along with the corresponding address information supplied by the source of address information 55, the encoding network 51 computes the parity bits according to the particular encoding employed, and transmits the information bits and parity checking bits to the appropriate storage address, while not transmitting the address bits.

The physical embodiment of the circuit 53 and the network 51 may be of the type illustrated in the noted Hamming et al. reissue patent or any modification thereof which may be accomplished by one skilled in the art. Also, the embodiments may be synthesized by a straightforward application of the digital logic required, as taught by any standard text on digital logic. See, for example, "Arithmetic Operations in Digital Computers" by R. K. Richards, Van Nostrand Publishing Company, 1955. With the structure of FIG. 1 in mind, a first specific example illustrating aspects of the present invention will now be presented hereinbelow.

Assume, for example, that the information store 50 embodies a 2×2 matrix memory, thereby containing four storage addresses. In binary form, the address is therefore expressible by two binary bits, henceforth denoted by $Z_0$ and $Z_1$.

Also, the binary word stored at each location will be assumed to contain two information digits, denoted in turn by $X_0$ and $X_1$. The parity check must, according to the principles of this invention, be performed on the two information bits $X_0$ and $X_1$ plus the two address bits $Z_0$ and $Z_1$, or the resulting four elements. Hamming has shown (see Table I, page 153, The Bell System Technical Journal, April 1950, or the noted reissue patent) that for four elements to be encoded, and to possess a single error correction, double error detection capability, three parity bits are necessary. These will be denoted by $Y_0$, $Y_1$ and $Y_2$. The value of each of these Y digits may be obtained from the set of formulae which will generate the Hamming code, wherein:

$$Y_0=X_0+X_1+Z_1$$
$$Y_1=X_0+Z_0+Z_1$$
$$Y_2=X_1+Z_0+Z_1$$

The plus sign shown in the above formulae indicates the modulo 2 sum, this being "exclusive-or" addition, that is, $Y=0$ for an even number of 1's in the sum and $Y=1$ for an odd number of 1's.

These sums are equivalent to placing $Y_0$, $Y_1$, $X_0$, $Y_2$, $X_1$, $Z_0$, $Z_1$ in columns 1 through 6, respectively, and computing the Y values as indicated in the cited Bell System Technical Journal article or the reissue patent.

A set of assumed information words along with their addresses and the resulting computed parity checks according to the computation definitions described hereinabove are presented in Table I below, wherein the additional partiy checking bit $Y_3$ will be identified hereinbelow.

*Table I*

| Address | | Information | | Parity Checking Bits | | | |
|---|---|---|---|---|---|---|---|
| $Z_0$ | $Z_1$ | $X_0$ | $X_1$ | $Y_0$ | $Y_1$ | $Y_2$ | $Y_3$ |
| 0 | 0 | 1 | 0 | 1 | 1 | 0 | 1 |
| 1 | 0 | 0 | 0 | 0 | 1 | 1 | 1 |
| 0 | 1 | 1 | 1 | 1 | 0 | 0 | 0 |
| 1 | 1 | 0 | 1 | 0 | 0 | 1 | 0 |

Thus, according to the principles described hereinbefore, only words formed from bits appearing in the two center columns $X_0$ and $X_1$ and three right-hand columns $Y_0$, $Y_1$ and $Y_2$ of Table I are stored at the addresses indicated by the two left-hand columns $X_0$ and $Z_1$.

Let the address $Z_0Z_1=10$, for example, be interrogated. The binary address 10 is sent from the source 55 to the information store 50 and, also, to the error detection and correction circuit 53. Upon recepition of the 10 address, the store 50 sends the corresponding word 01010 corresponding to $Y_0'$, $Y_1'$, $X_0'$, $Y_2'$, $X_1'$, respectively, of Table I. (The primes indicate that this is the read-out version of the stored values, the primed and the unprimed values being identical unless an error has occurred.)

When the error detecting and correcting circuit 53 contains both this read-out information word and also the corresponding address word, the circuit computes the following partiy rechecking modulo 2 sums $V_0$, $V_1$ and $V_2$, wherein:

$$V_2=Y_2'+X_1'+Z_0+Z_1$$
$$V_1=Y_1'+X_0'+Z_0+Z_1$$
$$V_0=Y_0'+X_0'+X_1'+Z_1$$

If no errors have occurred, each of these sums will equal 0. This is so because the respective Y's are augmented to the sums which were formerly used to compute them. Thus, if the sum for Y contained an odd number of 1's, Y would equal 1 and when this 1 value is added with the sum, the result of this exclusive-or addition is 0. A similar result occurs for the value of V if the respective Y should have equaled 0. Thus, in the case we have chosen $$V_2=1+0+1+0=0$$
$$V_1=1+0+1+0=0$$
$$V_0=0+0+0+0=0$$

The binary word $V_2V_1V_0=000$. This indicates that no error has occurred and, accordingly, an output results.

If, however, one of the stored elements has undergone an error in read-out or transmission, the binary word $V_2V_1V_0$ indicates this fact and actually yields the position of the bit in error, where the bits designated $Y_0$, $Y_1$, $X_0$, $Y_2$, $X_1$, $Z_0$ and $Z_1$ correspond to the $V_2V_1X_0$ numbers 001 through 111 (decimals 1 through 7), respectively.

More specifically, in example chosen, suppose $X_0'$, the read-out value of the $X_0$ stored information bit had somehow erroneously been converted to a 1. The input to the detection and correction network 53 would, therefore, be 01110 rather than 01010. Now, when the V parity checking sums are formed:

$$V_2=1+0+1+0=0$$
$$V_1=1+1+1+0=1$$
$$V_0=0+1+0+0=1$$

The binary word $V_2V_1V_0=011$ (in decimal form equals 3), and thus the element $X_0$ is found to be in error and hence automatically corrected, and an output results.

Automatic single error correction operation as described above is employed where double errors are prohibited from occurring. If it is desirable or necessary to detect double errors and also correct single errors, the following modifications are performed. First, a fourth parity checking bit $Y_3$ is stored at each location in the store. This bit is also computed by encoding network 51 in accordance with the principles of an even parity check as noted hereinbefore by performing a modulo 2 sum over the $X_0$, $X_1$, $Y_0$, $Y_1$ and $Y_2$ bits, that is, $$Y_3=X_0+X_1+Y_0+Y_1+Y_2+Z_0+Z_1$$

The $Y_3$ is stored with the information and parity bits from which it is derived. Also, an additional V function is computed in the error detecting and correcting circuit 53 in accordance with the equation $$V_3=Y_3'+X_0'+X_1'+Y_0'+Y_1'+Y_2'+Z_0+Z_1$$

This $V_3$ function is necessary to recheck the parity of the $Y_3$ checking element. (Once again the primes indicate that the elements are the read-out versions of the information contained in the information store 50.)

Operation of an illusrative system which includes the extra parity checking digit $Y_3$ and parity rechecking function $V_3$ is very similar to that previously discussed. Upon rechecking the parity in the circuit 53 the binary number $V_3V_2V_1V_0$ is formed. If this number is less than the binary number 1000 (decimal 8) a double error must have occurred, as this indicates that the check on $Y_3$, that is, a check generated by logic function $V_3$, has not failed, indicating either no error, or a double error, while a "1" for any of the sums $V_0$, $V_1$ or $V_2$ indicates at least one error. When combined with the $Y_3$ information, the system automatically detects the double error. If, on the other hand, any of the numbers 1001 through 1111 (8 through 15) are generated, this indicates that the respective element of the sequence $Y_3$, $Y_0$, $Y_1$, $X_0$, $Y_2$, $X_1$, $Z_0$ and $Z_1$ is in error. A more detailed discussion of the encoding and decoding is found in the aforementioned reissue patent or Bell System Technical Journal article.

Let us assume, for example, that the binary address 11 is interrogated. The word received by the error detecting and correcting circuit 53 from the information store 50 is the binary number 000011 corresponding to the $Y_3$, $Y_0$, $Y_1$, $X_0$, $Y_2$, $X_1$ bits as indicated in Table I. The $Y_3$ bits have been computed in accordance with the principles stated hereinabove. Suppose the $Y_0$ and the $Y_2$ digits both were in error. The resulting binary word formed of primed elements would be 010001, corresponding to $Y_3'$, $Y_0'$, $Y_1'$, $X_0'$, $Y_2'$, $X_1'$.

The V sums computed by the error detecting and correcting circuit 53 would be as follows:

$$V_3=0+1+0+0+0+1+1+1=0$$
$$V_2=0+1+1+1=1$$
$$V_1=0+0+1+1=0$$
$$V_0=1+0+1+1=1$$

The resulting binary word $V_3V_2V_1V_0$ equals 0101 and corresponds to the decimal number 5. Since 5 is, of course, less than 8 the error detecting and correcting circuit 53 automatically senses that a double error is present and sequentially directs a rereading of the store 50.

Let us continue the above example by further assuming that the $Y_0$ digits were not in error. Under these circumstances, the binary word read-out from the store 50 is 000001. This corresponds to a single error, the $Y_2$ bit having been erroneously changed from a 1 to a 0. The circuit 53 then computes the parity checking sums, wherein:

$$V_3=0+0+0+0+0+1+1+1=1$$
$$V_2=0+1+1+1=1$$
$$V_1=0+0+1+1=0$$
$$V_0=0+0+1+1=0$$

The binary word $V_3V_2V_1V_0$ now equals 1100 which has a decimal equivalent of 12. The digit corresponding to the decimal 12 is, as was described above, $Y_2$. The detection and correction circuit 53 now changes $Y_2$ to the opposite value, in this case from a 0 to a 1, and then generates an output.

In the above-described examples, all the errors encountered were contained either in the parity checking bits or the information bits of a word which was read from the proper storage location. If the read-out word came from an incorrect address and was correctly transmitted, the error detection and correction circuit 53 would detect an error in $Z_0$, $Z_1$ or possibly both of these bits which are supplied to the circuit 53 by the source of address information 55. The error detection and correction circuit 53, upon detection of an addressing error, directs a sequential readdressing of the information store 50.

Thus, the illustrative system described herein has been demonstrated to be capable of detecting and correcting any single errors in the information or parity checking bits, and of detecting any double errors and directing a sequential readdressing of the information store 50 in the case of a double error or any error in the addressing bits.

A second specific illustrative embodiment of the present invention is shown in FIG. 2. The addressing source 55, the information source 60 and the information store 50 are identical to the similar elements described above. A new information processing network shown as detection circuit 75 and a new encoding network 76, however, replace the error detecting and correcting network 53 and the encoding network 51, respectively. This system is capable of detecting single errors only and unable to directly correct any errors so detected, but may in turn direct a readdressing of the information store 50.

In this second embodiment each address of the information store 50 is supplied by the encoding network 76 with information bits which form an information binary word and one additional parity bit $Y_4$. This parity bit establishes, for example, an even parity check in the manner previously described, whereby the parity bit is a 1 for an odd number of 1's contained in the information bit locations, and a 0 for an even number of 1's contained thereat. The equation used by the encoding network 76 to compute $Y_4$ is $$Y_4 = X_0 + X_1 + Z_0 + Z_1$$

Table II below illustrates a typical operational situation for an error detector of this type. The information contained in the table and the address of the information is identical to that contained in Table I, only the parity checking bits having been changed to illustrate this new mode of operation.

*Table II*

| Address | | Information | | Parity Checking Bit |
|---|---|---|---|---|
| $Z_0$ | $Z_1$ | $X_0$ | $X_1$ | $Y_4$ |
| 0 | 0 | 1 | 0 | 1 |
| 1 | 0 | 0 | 0 | 1 |
| 0 | 1 | 1 | 1 | 1 |
| 1 | 1 | 0 | 1 | 1 |

In rechecking the parity, the detection network 75 computes the following modulo 2 sum:

$$V_4 = Y_4' + X_0' + X_1' + Z_1 + Z_0$$

Thus, $V_4=0$ indicates no errors, whereas $V_4=1$ denotes an error. It is to be noted that any even number of errors also would yield a 0 and this mode of operation is hence only applicable where the system is constrained to allow a maximum of one error.

Typical operation of the system shown in FIG. 2 may be illustrated by assuming that the address 00 is interrogated. This address 00 is transmitted from the source 55 along leads 30 and 31 to the store 50 and the detection network 75, respectively. Upon reception of this address, the storage medium 50 reads out the binary word 011 corresponding to $X_1'$, $X_0'$ and $Y_4'$, respectively, as indicated in Table II. When both this read-out word and also the address information are simultaneously contained in the detection network 75, the $V_4$ function is computed, wherein:

$$V_4 = 1+1+0+0+0 = 0$$

Since $V_4=0$, no error is assumed to have occurred.

Now, for example, let us assume that the word stored at the 10 address has been erroneously read-out from the store 50 instead of the interrogated 60 address. The information read-out of the store would be the binary word 001 corresponding to $X_1'$, $X_0'$, $Y_4'$. When the sum $V_4$ is computed the computation would be:

$$V_4 = 1+0+0+0+0 = 1$$

Thus, since the modulo 2 sum for $V_4=1$, an error is seen to have occurred. The detection network 75 responds to this occurrence by directing a readdressing of the information store 50.

Thus far, in the specific systems described, an information store has been interrogated to obtain information therefrom. This is not necessary for the practice of the principles of the present invention. This system of encoding a plurality of binary information words so as to render each uniquely identifiable may be used, for example, when a list of data must be transmitted and the position of each word must be identifiable.

If a table of logarithms is to be transmitted between two locations, it is obvious that this table is worthless unless the logarithms are matched with their corresponding decimal numbers. Thus, each decimal number would correspond to an address and would be encoded in binary form. Parity checking bits would be included with the binary equivalent of the logarithm, checking both information and address. At the receiving location, the binary equivalent of the address would be recombined with the received information, and the parity rechecked. Any errors incurred in transmission, and also any errors encountered by trying to associate an incorrect logarithm with a particular decimal number, would thereby be detected and subsequently corrected.

To increase the reliability of an information transmission system of the type described above, the successive binary words which are equivalent to the decimal addresses of the corresponding successive data words may advantageously be of a Gray-coded form, thereby minimizing the number of bits which change value between succeeding addresses. This encoding would reduce the number of errors detected in the parity rechecking operation if, for any reason, a digital word is checked against an incorrect identifying address word which is close in sequence to the correct addressing word.

It is to be understood that the above-described arrangements are only illustrative of the application of the principles of the present invention. Numerous other arrangements may be devised by those skilled in the art without departing from the spirit and scope of the invention. For example, the plurality of output leads 22 in FIG. 1 of the drawing may be converted to a single lead, in which case the read-out information from the store 50 would be in serial rather than parallel form. Also, the examples presented herein have employed a binary form of information logic. It should be understood, however, that these error detecting and correcting principles are applicable to a system employing a ternary or any other form of numerical representation.

What is claimed is:

1. In combination in a digital information system, an information source, a storage means containing a plurality of word address locations for storing digital words, each of said address locations being uniquely represented by an addressing digital word, an encoding network responding to both an information word supplied by said information source and an addressing digital word to compute a plurality of parity checking bits which include encoding data on both said information word and said addressing digital word, and means for transmitting said information word and said plurality of parity checking bits to the address location in said store means corresponding to said addressing digital word.

2. A combination as in claim 1 further comprising a source of address information which supplies each of said addressing digital words, wherein said storage means is responsive to the reception of one of said addressing digital words from said address source to read-out the one of said plurality of digital words to which said addressing digital word corresponds.

3. A combination as in claim 2 wherein said encoding network is of the error detecting and correcting type.

4. A combination as in claim 3 further comprising an error detecting and correcting circuit responsive to one of said addressing digital words supplied by said addressing source and the corresponding one of said plurality of stored digital words supplied by said storage means to recheck the encoding of the parity checking bits, to detect and correct errors which may be present in said stored digital words, and, to direct a sequential readdressing of said storage means when the error cannot be corrected, and/or the error occurs in the addressing digital word.

5. A combination as in claim 2 wherein said encoding network is only of the detecting type.

6. A combination as in claim 5 further comprising an error detecting circuit responsive to one of said addressing digital words supplied by said addressing source and the corresponding one of said plurality of stored digital words supplied by said storage means to recheck the encoding of said parity checking bits and detect errors which may be present in said stored digital word.

7. In an error detecting and correcting binary information system, means for storing a plurality of binary words at $2^n$ address locations, each of said address locations being uniquely represented by an $n$-bit binary address word, an information source supplying binary words each containing $m$ bits, and an encoding network responsive to one of said $m$-bit information words and one of said $2^n$ $n$-bit binary address words to compute $k$ parity checking bits which include encoding data on said $m$-bit information word and said $n$-bit addressing word, wherein $$2^{m+n} \leq \frac{2^{m+n+k}}{m+n+k+1}$$

and means for transmitting said $m$ information bits and said associated $k$ parity checking bits from said encoding network to the storage address in said storing means which is represented by said $n$-bit addressing word.

8. A combination as in claim 7 further comprising a source of address information which supplies said $2^n$ addressing words, each containing $n$ binary bits, each of said addressing words being in one to one correspondence with said $2^n$ address locations in said storing means, said storing means being responsive to the reception of one of said $2^n$ addressing words from said source of address information to read-out the corresponding one of said $2^n$ stored words.

9. A combination as in claim 8 further comprising an error detecting circuit responsive to one of said addressing digital words supplied by said addressing source and the corresponding one of said plurality of stored digital words supplied by said storing means to recheck the encoding of said parity checking bits and detect errors which may be present in said stored digital word.

10. In combination in an information system employing code groups, an information source, a source of addressing digital words, an encoding network, means containing a plurality of word address locations for storing digital words, each of said address locations being uniquely represented by an addressing digital word, said encoding network responsive to an information word supplied by said information source and one of said addressing digital words supplied by said address source to compute a plurality of parity checking bits which include encoding data possessing an error detection and correction capability on both said information word and said addressing digital word, means for transmitting said information word and said plurality of parity checking bits to the address in said storing means corresponding to said addressing digital word, said storing means being responsive to the reception of one of said addressing digital words from said address source to read-out the one of said plurality of digital words stored at the address location to which said addressing digital word corresponds, and an error detecting and correcting circuit which receives the read-out of said stored digital word from said storing means and the corresponding address word from said address source and is responsive to both said information word and said corresponding address word by rechecking the encoding of the parity checking bits and detecting and correcting errors which may be present therein and directing a sequential readdressing of said storage means if the error cannot be corrected.

11. In a digital system, means containing a plurality of word address locations for storing digital words, each of said address locations being uniquely represented by an addressing digital word, each of said word address locations containing words of a like number of digital bits, said bits being subdivided into information bearing bits and parity checking bits, said parity checking bits including encoding data on both said information bearing bits and the bits of said corresponding addressing digital word, said encoding possessing both error detecting and error correcting capabilities, a source of address information which supplies each of said addressing digital words, wherein said storing means is responsive to the reception of one of said addressing digital words from said address source to read out the one of said plurality of digital words to which said addressing digital word corresponds, and an error detecting and correcting circuit responsive to one of said addressing digital words supplied by said addressing source and the corresponding one of said plurality of stored digital words supplied by said storing means to recheck the encoding of the parity checking bits, to detect and correct errors which may be present in said stored digital words, and to direct a sequential readdressing of said storage means when the error cannot be corrected, and/or the error occurs in the addressing digital word.

12. In combination in an information system employing code groups, means for supplying a first finite set of unique digital words, a second set of digital words in one to one correspondence with the words of said first set and dependent thereon, means for storing said second set of digital words and responsive to each word of said first set to read-out the corresponding word of said second set, each word of said second set containing both information bits and parity checking bits, each parity checking bit including encoding data on the bits of a word formed by combining the bits of a particular one of said second set and the bits of the corresponding word of said first set, and an error detecting and correcting network connected to said storing means and to said supplying means and responsive to a word from said storing means and the corresponding word from said supplying means for rechecking the parity relationship between the bits of said corresponding words.

13. In combination in an information transmission system, means for supplying a tabularized list of digital data words to be transmitted, a plurality of numbering digital words in one to one correspondence with said list of digital data words, means for transmitting said data words in a predetermined numbered order wherein each place in said numbered order of transmission is represented by one of said plurality of numbering digital words, each of said digital data words being subdivided into both information bits and parity checking bits, and means for generating said parity checking bits by performing an encoding on both said information bits of one of said digital data words and the bits of the corresponding one of said numbering digital words, wherein said generating means is of the error detecting and correcting type.

14. A combination as in claim 13 further comprising means for supplying said numbering digital words, and an error detecting and correcting circuit connected to said numbering digital word supplying means and to said transmitting means and responsive to a digital data word and its corresponding numbering digital word supplied by said numbering digital word supplying means to recheck the encoding of the parity checking bits, and to detect and correct errors which may be present in said digital data word.

References Cited by the Examiner

UNITED STATES PATENTS

| | | | |
|---|---|---|---|
| 3,037,191 | 5/1962 | Crosby | 340—146.1 |
| 3,045,209 | 7/1962 | Pomerene | 340—146.1 |

OTHER REFERENCES

Error Detecting and Correcting Circuit (Brandt), IBM Technical Disclosure Bulletin, vol. 3, No. 6, November 1960, pp. 23–26.

ROBERT C. BAILEY, *Primary Examiner.*

MALCOLM A. MORRISON, *Examiner.*